Patented June 9, 1936

2,043,954

UNITED STATES PATENT OFFICE 2,043,954

SEPARATIVE DIAPHRAGM FOR ELECTROLYTIC CELLS AND PROCESS FOR PRODUCING THE SAME

William E. Kershaw, Gwynedd Valley, Pa., assignor to The Electric Storage Battery Company, Philadelphia, Pa., a corporation of New Jersey No Drawing. Application January 2, 1931, Serial No. 506,326

3 Claims. (Cl. 18—53)

The diaphragm of this invention consists of a substantially solid but porous body composed of a finely divided or powdered material, which is preferably but not necessarily porous in itself, bound together by an initially fluid or plastic agent which has been previously dispersed into the discontinuous phase of an emulsion in a liquid non-miscible therewith, the whole having been thoroughly mixed together, with or without the admixture of reinforcing fibers, the binding agent set or deposited out of its dispersing liquid by heat or other means, causing it to adhere to but not completely coat the comminuted material uniformly throughout the mass, and the dispersing liquid afterward removed by drying or other suitable means.

In the development of the present invention, it was discovered that, upon mixing an emulsion containing a plastic cementing agent and a liquid, with a finely comminuted porous or pulverulent substance, if the plastic cement was in the continuous phase in the emulsion, then the resultant product, upon the setting of such cementing substance, while highly porous, would be of low electrolytic permeability. Such a product may be likened to a piece of rubber foam in which the envelopes of the bubbles are composed of a continuous membrane of rubber. Such a product may have porosity of a very high order, and yet its permeability to an electrionic flow may be practically nil.

It was however discovered that if the emulsion is mixed with the subdivided substance when the cementing material is in the discontinuous phase, the water or other liquid forming the continuous phase tends to keep its continuity unbroken even under heavy pressure, and the resultant product has many of the properties but not the structure of a bundle of felted fibers, retaining a very high degree of permeability, and the flexibility and resistance to shock become very marked.

In the utilization and application of this discovery to the production of separators for electric storage batteries, an extremely large number of substances having a great variety of varying physical characteristics become available. Furthermore, in most cases, emulsions of two or more of the cementing materials may be mixed or they may first be mixed with separate portions of comminuted substances and these portions afterwards mixed together. In this way, it has been found that it is possible to make a great variety of new products which represent almost every conceivable physical variant in the way of moldability, flexibility, toughness and the like.

The properties of such materials may be still further modified by the incorporation therein of fibrous materials either organic or inorganic. As examples of such materials, cotton linters, asbestos fiber, "Vulcan's Hair" and spun glass may be mentioned.

As specific illustrations of the application of the above, I may mention the following, not with any intention of limiting the invention to the instances mentioned, but rather to make clear the broad nature of their application. Many other applications and modifications will readily occur to those skilled in the art.

As an excellent illustration of such emulsion and one which is available on the market, I may take rubber latex. This when thoroughly mixed with the necessary proportions of sulphur for vulcanization to hard rubber and of water to obtain a pasty mixture with such substances as diatomaceous earth, the whole being made up in such a manner that there will be approximately 25% by weight of vulcanized hard rubber in the resultant material, will give a product prior to vulcanization which can be readily molded by rolling or hydraulic pressure into smooth or ribbed sheets which can then be vulcanized in the usual way, the sheets being separated during vulcanization by layers of porous paper, cloth, screen or talc, and afterwards cut or trimmed to such sizes as may make them most suitable for separators in the ordinary forms of storage batteries, or for other uses.

In carrying out the above, owing to the tendency of ordinary hydrated diatomaceous earth to depolarize the rubber latex particles, thus causing their premature coagulation, it is advisable to use calcined diatomaceous earth, which has an almost neutral reaction.

As a second illustration, I may replace the latex in the above, with the consequent omission of the sulphur, by an emulsified condensation product, such as bakelite. Such a product has now been placed on the market with the plastic cement in the inner or discontinuous phase and is sold under the trade name Durez by General Plastics, Inc., North Tonowanda, New York.

The subsequent condensation may take place either directly through the use of heated molds, or in a vulcanizer or any suitable ovens. About the same portion of the condensing cement may be employed, namely, 25% by weight in the finished product.

As a third illustration, I may take equal portions of the two mixtures mentioned above, before heating, and mix and heat them as before. The resulting material or product has especially valuable properties in that the presence of the condensation product tends to prevent the oxidation of the rubber by electrolytic action.

As a fourth illustration, an emulsion of any pitch, asphalt, resinous, waxy or bituminous substance with water may be made in a mixing machine at any temperature below the boiling point of water at which such substances may be plastic, by using a small quantity, say 5% or 10% of a porous hydrous material such as diatomaceous earth. In the case of substances which only become plastic at higher temperatures, the mixing may be done in an autoclave. In all such emulsions, the cementing agent tends to be in the continuous phase, but they may be readily reversed by the introduction of a suitable colloid. I have found the colloidal clay marketed under the name of "Bentonite" to be entirely suitable for this purpose. After the emulsion is made, more water and the inert powder are added and the molding and setting operations are conducted as outlined above. As a more specific illustration of this, a mixture, made by melting together two parts of cumarone varnish grade resin and one of steam refined asphaltic oil residue, may be emulsified with water in a mixer as above and then mixed in the proportion of 25% of the binding agent with 75% of diatomaceous earth and the whole molded and set by heat as outlined before.

As a fifth illustration, I may emulsify sodium silicate solution with a volatile oil such as toluene and proceed as before. In this case, the cementing action is enhanced by the chemical combination taking place between the sodium silicate and the hyaline silica of the diatomaceous earth. Instead of the volatile oil, a non-volatile oil such as castor oil may be used, this being afterwards removed by washing with light volatile miscible oils.

In the sixth illustration, an emulsion of pyroxylin may be made from any of its solutions and the mass solidified as before.

To any of the above may be added 2% or more of fibrous material such as cotton linter or the whole mass may be molded upon a flexible fibrous sheet such as fibrous sheets of glass wool which are available on the market.

Although mention has been made of mixtures in which the cement constitutes 25% by weight of the resultant mass, it is obvious that the proportions employed may vary according to the nature of the cementing substance and according to the properties desired in the resultant material. Exact control of the coating of the particles of powdered material is obtainable by predetermining their average size as by sieving or by flotation methods, and controlling the size of the globules of dispersed binder so that they are much finer than said particles of powdered material, and then controlling the amount of binding globules in reference to their surface tension, so that when they are caused to set and adhere to the surface of the particles, their surface tension in the surrounding liquid prevents them from coalescing into a continuous and impermeable coating. The exact porosity of the final body is the balance between the volume of solids present when the binder is set and the volume of dispersing liquid, which is afterwards removed.

It should also be recognized that any acid resistant substance capable of being reduced to a fine powder may be used in place of the diatomaceous earth. Thus, mica, kaolin, and certain varieties of amphibole asbestos whose fibers are so short that the mass does not appear fibrous, are entirely suitable for use.

It should also be noted that, particularly in the case of diatomaceous earth, although the proportion of binder by weight may appear large, yet due to the extremely porous nature of the former, the actual proportion of the binder by volume may run as low as 5% thus, in part, accounting for the extraordinary permeability which materials made in accordance with these specifications have been found to have. The same relation holds to a greater or less degree in the case of finely divided solid material due to the state of subdivision, so that where maximum porosity is desirable the binder should be present in a minor proportion by volume. Where extreme porosity is not absolutely necessary, the proportion of binder may be increased and in the case of storage battery separators where only low discharge rates are to be provided for and minimum internal resistance is not of vital importance, the proportion of binder by volume may approach 50%.

Any of the above mixtures before setting may contain enough liquid to make it fluid, so it may be applied directly to the electrodes or to a fibrous support as paint. With less liquid it can be pasted as a layer on cloths or wire netting or into molds. With still less, it can be rolled into plain ribbed or corrugated sheets. With soaps or other lubricating agents, it can be extruded into flat or round forms or tubes.

The finished product may be used to support what are generally known as active materials in electrolytic cells, rather than relying principally upon the usual heavy metallic support as in the case of metallic grids or plates.

Due to the uniformity of distribution and method of application of the binder, the resultant body or product has remarkable tensile strength and resistance to abrasion, even when as little as 10% by weight of the binder is used and will withstand all ordinary handling. The electrical resistance is low (it can be lower than that of the usual wood diaphragm), and does not increase faster than the thickness as is usually the case when binders are used in solution. Under the microscope, there at first appears to be no binder present at all due to its fineness and uniformity, so that the tiny cementing bonds between particles are easily overlooked. This presents strong contrast with the appearance of separators made with binders in solution, as in these the binder is much in evidence, forming a kind of net work in which particles are embedded and imprisoned.

Inasmuch as the present invention is chemical in its nature, I claim the benefit of the somewhat broader doctrine of equivalents applicable in such cases and I do not limit myself to matters of detail or mere form recited in the foregoing description.

I claim:
1. A porous separator and retainer for storage batteries permeable to an electrionic flow and substantially non-hydrolyzable in a storage battery and comprising in major part particles of diatomaceous earth in spaced relationship providing pores and bonded to form a solid mass by scattered particles of vulcanized rubber latex.

2. A porous separator and retainer for storage batteries permeable to an electrionic flow and substantially non-hydrolyzable in a storage battery and comprising in major part particles of inert non-oxidizable powdered material in spaced relationship providing pores and bonded to form a solid mass by scattered particles of a cementing agent of colloidal dimensions.

3. The molding process which consists in mixing an inert non-oxidizable powdered material with a cementing agent dispersed in a liquid non-miscible therewith in which the dispersed globules are finer than the particles of inert material, the relative proportions of the inert particles with reference to the cementing agent and the dispersing liquid being adjusted so that the mixture is bound together into a plastic mass, but the amount of cementing agent is only sufficient to set and adhere to the inert material, forming scattered particles of cementing agent, their surface tension in the dispersing agent being such as to prevent their coalescing on the surface of the inert particles into a continuous and impermeable coating, the amount of dispersing liquid being adjusted to produce the desired porosity in the final product, setting, shaping, and curing to form electrolytically permeable separators or retainers for storage batteries.

WILLIAM E. KERSHAW.